(No Model.)

E. A. FLOYD.
BEE SWARMER.

No. 497,518. Patented May 16, 1893.

WITNESSES
Geo. E. Frech
Roland A. Fitzgerald

INVENTOR
E. A. Floyd
By Lehmann, Pattison & Nesbit
attys.

UNITED STATES PATENT OFFICE.

EDWARD AUGUSTUS FLOYD, OF PAOLA, KANSAS.

BEE-SWARMER.

SPECIFICATION forming part of Letters Patent No. 497,518, dated May 16, 1893.

Application filed December 21, 1892. Serial No. 455,927. (No model.)

*To all whom it may concern:*

Be it known that I, EDWARD AUGUSTUS FLOYD, of Paola, in the county of Miami and State of Kansas, have invented certain new and useful Improvements in Bee-Swarmers; and I do hereby declare the following to be a full, clear, and exact description of the invention, such as will enable others skilled in the art to which it pertains to make and use it, reference being had to the accompanying drawings, which form part of this specification.

My invention relates to an improvement in bee swarmers, and it consists in the novel features of construction hereinafter fully described and especially referred to in the claims.

The object of my invention is to provide an improved swarmer which will permit the passage of bees therethrough in either direction, thus enabling the swarming bees to return to the old hive if dissatisfied with the new one provided for them. It frequently occurs that bees swarm before they are ready for the change or at a time when the conditions are unfavorable for the successful formation of a new home, and under such circumstances they naturally return, if unrestrained, to the old hive.

By my improved swarmer the bees are kept under control while at the same time they are not hindered from following the dictates of nature in going from or returning to the old hive.

Figure 1:
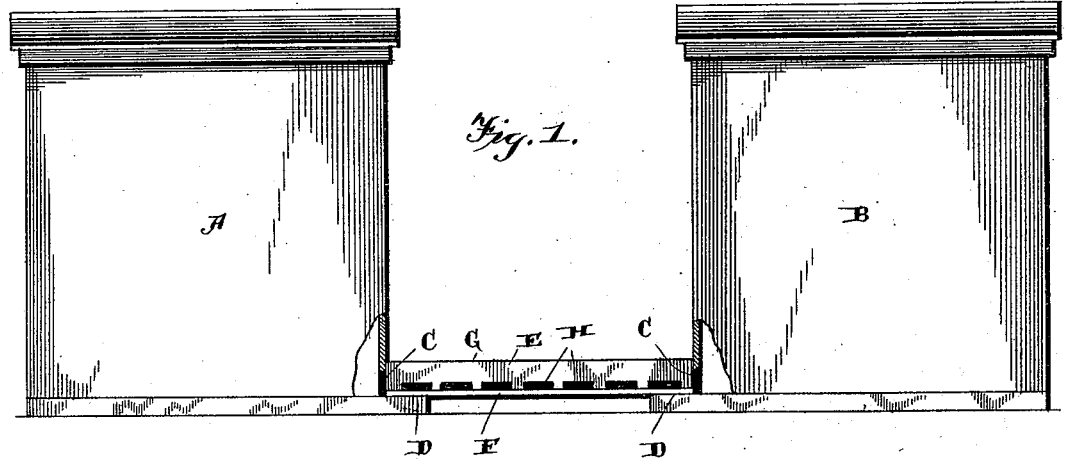
Figure 2:
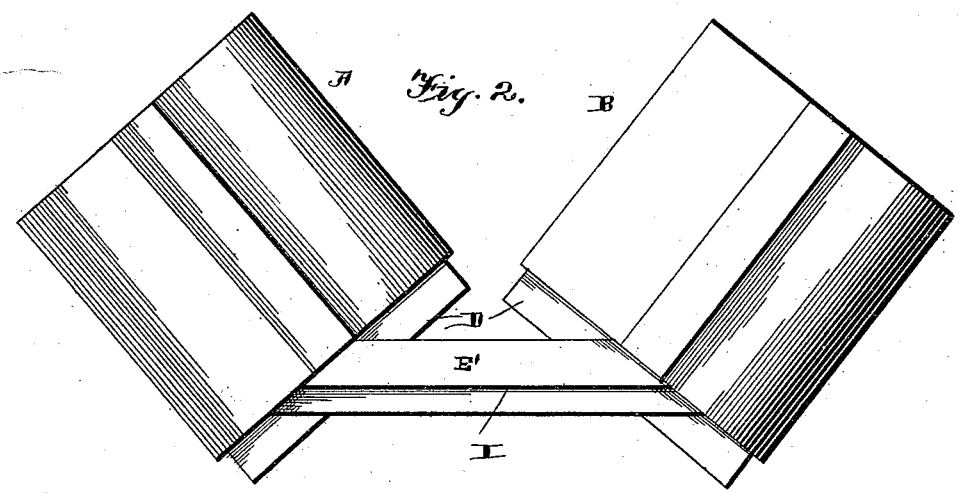
Figure 3:
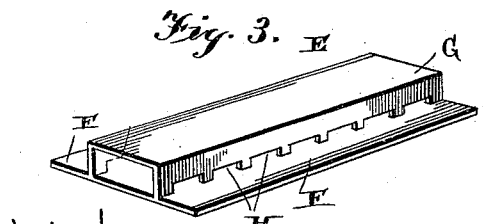
Figure 4:
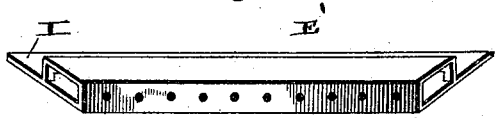

Refering to the accompanying drawings: Figure 1, is a side elevation of two hives connected by my improved swarmer. Fig. 2, is a plan view of the same hives showing them connected by a swarmer of slightly modified form. Fig. 3, is a perspective view of the swarmer. Fig. 4, is a similar view of the modified form of swarmer shown in Fig. 2.

A designates the hive from which we will suppose the swarm is about to secede and B the new hive provided for their reception. The fronts of these hives are provided with the usual passages C which open out upon the alighting ledges D extending the whole length of each hive.

For connecting the two hives so as to guide the swarm to its new home a swarmer E is provided which in the constructions shown in Figs. 1 and 3, consists of a wide bottom F having a longitudinal covering G secured to its upper side but of less width than said bottom so that the edges of the latter constitute alighting ledges for the workers in passing in and out of the swarmer through the small openings H at the lower edges of covering G. As shown these openings are slightly elongated and are level with the bottom F so that no step obstructs the passage of the working bees. The openings H however, are not sufficiently large to permit the passage of the queen or drones so that the same are confined in either one hive or the other it being impossible for them to escape.

The swarmer E' illustrated in Figs. 2 and 4, has its ends so cut that when adjusted to the hives as in Fig. 2, the latter do not face squarely each other but rather at an angle thus presenting one long inlet and exit side I, which in structure is the same as one side of swarmer E, while its opposite side is simply perforated to afford ventilation and has no alighting ledge.

Either form of swarmer may be employed to advantage as the bees are thereby conducted to the new hive with safety and without the necessity of watching or other attention.

Having thus fully described my invention, what I claim, and desire to secure by Letters Patent, is—

1. In a bee swarmer the combination of two hives, a covered unobstructed swarmer for connecting them through which bees may pass from either hive to the other, the swarmer being provided with openings for the passage of the workers, and an alighting ledge beneath the said openings, substantially as shown and described.

2. An improved swarmer comprising a floor, the edges of which constitute alighting ledges, a covering narrower than the floor and which is secured thereto to form a longitudinal passage, the said covering being formed with longitudinal openings at its lower edges for the passage of the workers, substantially as shown and described.

3. In a bee swarmer, the combination of two hives having exits, alighting ledges projecting beneath the latter, a swarmer adapted to rest on said ledges and connect the hives, the said swarmer consisting of a floor having projecting ledges which constitute alighting ledges, a longitudinal covering which is secured to but narrower than the floor and which is formed with openings for the passage of the workers, substantially as shown and described.

In testimony whereof I affix my signature in presence of two witnesses.

EDWARD AUGUSTUS FLOYD.

Witnesses:
E. J. SHELDON,
J. F. BRADBURY.